United States Patent [19]
Bohne et al.

[11] 3,992,176
[45] Nov. 16, 1976

[54] DRY SCRUBBING TAR AND FLUORIDE LADEN GASES

[75] Inventors: Philip W. Bohne; Michael R. Cuccia, both of Metairie, La.; Tom S. Moughon, Jr., Golden Dale, Wash.

[73] Assignee: Kaiser Aluminum & Chemical Corporation, Oakland, Calif.

[22] Filed: Nov. 6, 1974

[21] Appl. No.: 521,412

Related U.S. Application Data

[63] Continuation-in-part of Ser. No. 409,051, Oct. 24, 1973, abandoned.

[52] U.S. Cl. ........................................ 55/71; 55/79
[51] Int. Cl.² ........................................ B01D 53/06
[58] Field of Search .................. 55/71, 77, 79, 390; 204/67

[56] References Cited
UNITED STATES PATENTS

| | | | |
|---|---|---|---|
| 3,503,184 | 3/1970 | Knapp et al. | 55/71 |
| 3,790,143 | 2/1974 | Nix | 55/71 |
| 3,827,955 | 8/1974 | Bahri et al. | 55/71 |

Primary Examiner—John Adee
Attorney, Agent, or Firm—Paul E. Calrow; Edward J. Lynch

[57] ABSTRACT

This invention relates to a method of treating tar and fluoride laden gases for the removal of tar and fluorides therefrom, particularly the cell off-gases from a Soderberg reduction cell, an anode baking furnace and the like wherein reduction-grade alumina is entrained in the tar and fluoride laden gases and then this mixture is passed through a foraminous plate above which is maintained a turbulent mass of alumina.

11 Claims, 2 Drawing Figures

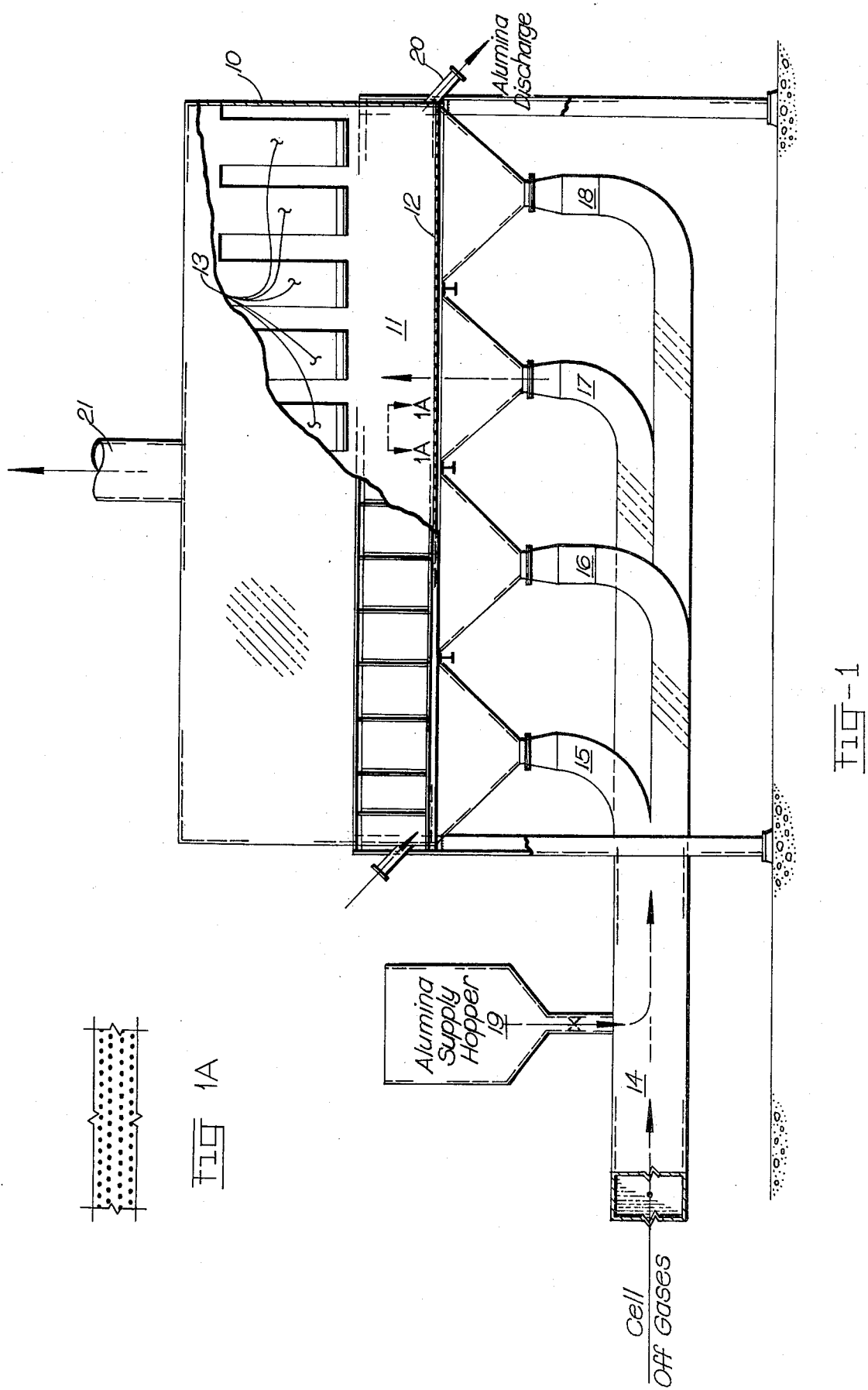

DRY SCRUBBING TAR AND FLUORIDE LADEN GASES

RELATED APPLICATIONS

This application is a continuation-in-part of copending application Ser. No. 409,051 filed Oct. 24, 1973 now abandoned.

BACKGROUND OF THE INVENTION

The present invention relates to an improved method of removing gaseous fluoride, condensable tars, particulate matter and the like from gases which evolve from a Hall-Heroult-type aluminum reduction cell, particularly the off-gases from a reduction cell with a Soderberg anode and prebaked anode baking furnaces.

The cell off-gases from an aluminum reduction cell generally comprise a dilute mixture of air with gaseous fluorides, carbon dioxide, carbon monoxide, particulate matter and the like. The gaseous fluorides are essentially HF. The particulate matter comprises finely divided alumina, carbon and other carbonaceous materials and also solid fluorides, such as cryolite ($Na_3AlF_6$), aluminum fluoride ($AlF_6$), sodium fluoride (NaF), calcium fluoride ($CaF_2$) and chiolite ($Na_5Al_3F_4$). Soderberg reduction cells have one large anode which is baked in place from a paste of carbon aggregate and pitch or tar. The baking of the anode results in the evolution of considerable amounts of tarry, carbonaceous materials, commonly termed "tar fog". The carbonaceous materials evolving from vertical stud Soderberg anodes are sometimes of sufficient concentration to allow for the combustion of the tarry materials, but, because of the harsh environment, maintaining burners in operating condition is very difficult. There is no practical way to economically burn the carbonaceous materials evolving from horizontal stud Soderberg anodes because of the low concentration of carbonaceous materials in the off-gases. The tar-contaminated gas mixture evolving from a Soderberg reduction cell renders the subsequent treatment of the gas very difficult because much of the carbonaceous matter in the gas is sticky or condensable and thus tends to foul or plug any subsequent gas treating facility.

Generally, two methods have been employed over the years in treating the cell off-gases from an aluminum reduction cell to remove fluorides. The first involves the scrubbing of the cell off-gases with water to remove the fluorides. However, the wet method is not very desirable because it more or less converts an air pollution problem into a water pollution problem due to the fact that an aqueous solution of fluoride is very difficult to discard without extensive treatment. Frequently, the wet method includes treatment with lime or limestone to react with the fluorides to form $CaF_2$. The other method, a dry method, involves intimately contacting the cell off-gases with the alumina fed to the cell so as to sorb the gaseous fluoride in the cell off-gases onto the alumina surfaces. Up to 99.95% of the gaseous fluoride evolving from the cell can be captured by this method. An additional advantage of the dry method is that all of the fluoride captured can be returned to the cell along with the cell feed. Several methods have been employed in contacting the alumina cell feed with the fluoride laden cell off-gases. One method shown in Canadian Pat. No. 613,352 and U.S. Pat. No. 2,875,844 is to introduce alumina into the moving stream of the cell off-gases and then subsequently removing the particulate matter including the alumina from the gaseous stream by a suitable means, such as a baghouse or an electrostatic precipitator. Another method shown in U.S. Pat. Nos. 2,934,405 and 3,503,184 is to pass the fluoride-containing off-gases through a bed of alumina. In the latter method, probably the most efficient, it is preferred to pass the fluoride-laden cell off-gases through a bed of finely divided alumina and then subsequently removing any particulate matter including alumina by means of filter bags or an electrostatic precipitator. However, neither of these two dry methods have been employed to any significant extent with the off-gases from a horizontal stud Soderberg cell because the tarry, carbonaceous materials which evolve from the baking anode tend to foul and plug up any gas treatment equipment facilitates that might be employed.

In the manufacture of carbon anodes for use in a prebake aluminum reduction cell, the anodes are usually baked in a ring furnace such as is described in U.S. Pat. No. 2,699,931 which is hereby incorporated in its entirety by reference. In these anode baking furnaces, the pitch which holds the "green" anode together is carbonized to provide the density, conductivity and soundness for use in an aluminum reduction cell. In addition to the volatile hydrocarbon material which evolves, fluorides also evolve. The fluoride source in this instance is the carbon aggregate which is used to make up the green carbon anode. Some of the aggregate comes from used anode butts which are crushed and added to the mixture which makes up the anode. Much fluoride from the reduction cell bath remains on the surface and within the interstices of the anode butts. Tars and condensable carbonaceous materials also are generated in the combustion of fuel utilized to heat the furnace.

Prior methods of treating of effluent from these anode baking furnaces or ring furnaces as they are frequently called have generally been directed to burning the tars and carbonaceous materials. Except for passing the gas through a water spray chamber, no effort was usually made to remove the fluoride in the effluent.

Against this background, the present invention was developed.

DESCRIPTION OF THE DRAWINGS

FIG. 1 is a side view with parts exposed for clarity of the gas treating system of the present invention. FIG. 1A is a top view of the foraminous plate in the reaction chamber.

DESCRIPTION OF THE INVENTION

The present invention is directed to an improved method of dry scrubbing gases containing fluorides and tars such as the gases which evolve from an aluminum reduction cell with a Soderberg anode and from an anode baking furnace.

In accordance with the present invention, the fluoride and tar-laden off-gases from the cell or other source are mixed with appropriate amounts of pulverulent alumina cell feed and then directed up through a foraminous plate in a reaction chamber above which is maintained a turbulent mass of pulverulent alumina. The gas passes through this mass of alumina to a dust collection system to remove essentially all particulate matter therefrom and then is vented to the atmosphere or additional treatment facilities if desired. By introducing the alumina such as reduction cell feed into the gaseous stream prior to the reaction chamber, most of the condensable carbonaceous or tarry materials in the cell off-gases will condense onto the alumina introduced and thereby minimize the fouling effect of the tar fog. Moreover, the alumina in the gaseous stream removes any build-up of tarry materials which may occur in the gas treating unit. No substantial reduction is found in the amount of gaseous fluoride sorbed onto the surface of the alumina particles due to the condensation of the carbonaceous matter onto the alumina. The amount of alumina used for treating the gaseous stream can range from about 10 to 100% of the alumina required by the reduction cells.

Referring to the drawing which illustrates a preferred embodiment, the reactor 10 generally comprises a chamber 11 within which is disposed a foraminous dispersing plate 12. A plurality of filter bags 13 are disposed therein a suitable distance above the dispersing plate 12 and usually are provided with suitable agitating means (not shown) so as to periodically shake the bags to remove any build-up of particulate matter on the collecting surfaces. The fluoride-laden gases are directed to the reactor 10 from conduit 14 through conduits 15, 16, 17 and 18, as shown. The pulverulent alumina is introduced into the conduit 14 from the alumina supply hopper 19. Discharge conduit 20 is provided to discharge the alumina from the reactor chamber 11. All of the alumina discharged from the reactor can be fed to the reduction cell, but, frequently, it is desirable to recycle portions of the discharged alumina to the gaseous stream before the reactor 10.

In operation, the fluoride-tar laden cell off-gases are withdrawn from the reduction cells, anode baking furnaces or other sources and passes through conduit 14 wherein alumina, preferably fresh alumina, is dispersed therein from the supply hopper 19. This solid gaseous mixture is directed up through the dispersing plate 12 and through the turbulent mass of pulverulent alumina which is maintained above the dispersing plate. The gaseous stream then passes through the filter bags 13 for particulate removal and then vented through conduit 21 to the atmosphere or other treatment facilities if desired. Periodically, the filter bags are agitated to remove build-up of particulate matter and to return same to the turbulent region. Initially, most of the condensable tars condense on the alumina particles when the alumina is introduced into conduit 14 but before the gases pass through the dispersing plate. By the time the gas passes through the turbulent region above the dispersing plate, it is essentially free of gaseous fluorides and thus can be passed to a suitable dust collection system, such as a baghouse or an electrostatic precipitator, for removing particulate matter. The rate of discharging alumina from the reaction chamber is preferably controlled so as to maintain a relavely constant pressure drop through the reactor.

It might be expected that the openings in the foraminous plate would quickly erode due to the passage of highly abrasive alumina at high velocity through the openings. However, little erosion is found even over long periods, such as 12 months or more. In addition, no significant build-up of tar or other carbonaceous matter is found on the gas treating equipment. The tars which condense pose no problems within the reaction chamber, the filter bags or any subsequent handling facilities.

The alumina discharged from the reactor can be directed as is to the reduction cell as cell feed, but it may be preferred to pass the tar coated alumina through a combustion chamber or other suitable device to drive off and burn the carbonaceous contaminant material. Substantially little or no fluorides will be driven off from the alumina in such an operation, provides the temperatures are not excessive.

The amount of alumina entrained in the fluoride-laden gaseous stream prior to the reaction chamber is that necessary to provide a grain loading of about 1 to 200 grains per standard cubic foot (SCF), preferably from about 1–50 grains per SCF. To maintain particulate entrainment, the gas velocity in the stream should range from about 50 to 100 feet per second, preferably about 60 to 85 feet per second. The velocity of the gases through the dispersion plate must be sufficient to prevent any substantial quantity of alumina above the diffuser plate from falling through the openings and must be sufficient to maintain the alumina above the plate in a turbulent condition. The apertures in the foraminous plate generally have a diameter of about 0.1 to about 0.3 inch and are located on from about 1-inch to 3-inch centers. Preferably, the alumina-gas mixture above the foraminous plate is a dense turbulent mass more or less undefined in shape but approaching a spouting bed-type configuration. The overall or superficial gas velocity through this turbulent region ranges from about 0.5 to 5 feet per second, preferably about 1 to 2 feet per second. Residence times for alumina in the reaction chamber range from about 5 minutes to 10 hours depending upon the load of alumina in the reactor and the recycle load of alumina to the reactor unit. For efficient fluoride removal, the reduction-grade alumina particles should range from about 44 to 149 microns in size. However, up to 8% can be less than 44 microns and up to about 4% can be above 149 microns. The alpha alumina content should be less than 30%.

The method of the present invention provides for efficient fluoride, tar and solid particulate capture even though the fluoride, tar and particulate emissions from the reduction cell or other source may vary considerably over a period of time such as due to changes in the operating characteristics of the cell. For example, the fluoride emissions increase considerably every time the crust (i.e., the frozen electrolyte on the surface of the cell) is broken, such as when feeding alumina to the cell. Copious amounts of fluoride also escape during anode effects which occur when there is a depletion of alumina dissolved in the electrolyte. In horizontal stud Soderberg cells, tar emissions increase considerably during periods when the flexes are raised, this being the time when the electrical conductors or flexes which feed current to the cell are raised to the next higher row of studs and the lower row of studs is removed to prevent any contact thereof with the bath. As an example of this variation, the total particulate loading of the cell off-gases can range from about 0.005 to over 0.2 grain/SCF. The tar fog can vary from about 0.001 to about 0.02 grain/SCF. The gaseous fluorides can vary from about 0.005 to about 0.1 grain per standard cubic foot. However, notwithstanding these variations, the method of the present invention consistently maintains a high fluoride removal.

The examples in the table below are given to further illustrate an embodiment of the present invention. This data was collected for an experimental unit handling the off-gases of 9 horizontal stud Soderberg reduction cells (75KA) employing the method of the present invention. The data relate to the off-gases from all 9 cells. Gas temperatures in the reactor ranged from about 120° to 200° F depending upon the ambient temperatures. The concentration values are mean values of the test period which ranged in duration from about 2 to 5 hours. The air-to-cloth ratio for the filter bags was 5.25 ACFM/ft² of bag.

|  | Run No. | | | | |
|---|---|---|---|---|---|
|  | 1 | 2 | 3 | 4 | 5 |
| Cell Gas Flow, SCFM | 36,000 | 36,000 | 36,000 | 36,000 | 36,000 |
| Fresh Alumina Feed, grain/SCF | 2.67 | 2.67 | 2.67 | 2.67 | 2.67 |
| Gaseous F, grains/SCF | .00003 | .00016 | .00002 | .00005 | .00017 |
| Solid F, grains/SCF | .00024 | .00022 | .00008 | .00022 | .00012 |
| Tar Fog grains/SCF | .00017 | .00004 | .00005 | .00004 | .00007 |
| % Removal Gaseous F | 99.5 | 96.3 | 93.8 | 98.6 | 96.5 |
| % Removal Solid F | 98.9 | 98.9 | 98.9 | 96.2 | 99.5 |
| % Removal Tar Fog | 97.9 | 99.6 | 99.6 | 99.4 | 99.8 |

It is recognized that various modifications and improvements can be made upon the present invention without departing from the spirit thereof and the scope of the appended claims. For example, when recycling alumina discharged from the reactor, all or portions of the fresh alumina could be introduced into the reactor above the foraminous plate rather than in the gaseous stream before the reactor. Moreover, although the invention is described herein primarily as a treatment for the off-gases from a horizontal stud Soderberg cell or an anode baking furnace, it is fully applicable to any fluoride-containing gaseous stream which contains condensable or sticky carbonaceous materials. For example, the present method can be used with the off-gases from vertical stud Soderberg cells, and it eliminates the problem of maintaining burners in such a harsh environment.

What is claimed is:

1. A method of treating a gaseous stream containing fluoride and heavily laden with condensable carbonaceous matter comprising:
   a. introducing pulverulent alumina into a moving gaseous stream containing gaseous fluoride and heavily laden with condensable carbonaceous matter to entrain therein said alumina and to cause said carbonaceous matter to condense onto said alumina;
   b. directing said alumina containing gaseous stream into a chamber containing therein a foraminous plate and having pulverulent alumina disposed above said foraminous plate;
   c. passing said alumina-containing gaseous stream through said foraminous plate so as to maintain the alumina above said plate in a turbulent condition, thereby removing essentially all gaseous fluoride from the gaseous stream; and
   d. subsequently removing essentially all particulate matter from said gaseous stream.

2. A method of treating a gaseous stream containing fluoride and heavily laden with tar and/or condensable carbonaceous matter comprising:
   a. introducing pulverulent alumina into a moving gaseous stream of said effluent to entrain therein the pulverulent alumina and to cause said tar and/or carbonaceous matter to deposit and/or condense onto said alumina;
   b. directing the alumina containing gaseous stream to a chamber containing therein a foraminous plate and having pulverulent alumina disposed above said foraminous plate;
   c. passing the alumina containing gaseous stream through the foraminous plate so as to maintain the alumina above the plate in a turbulent condition and to thereby remove essentially all gaseous fluoride from the gaseous stream; and
   d. subsequently removing essentially all particulate matter from the gaseous stream.

3. The method of claim 2 including discharging alumina above said foraminous plate from said chamber and recycling from about 10 to 80% of said discharged alumina into the moving gaseous stream before the stream is passed through the foraminous plate.

4. The method of claim 3 wherein said recycled alumina amounts to about 10 to 100% of the alumina entrained in the moving gaseous stream before the stream passes through the foraminous plate.

5. The method of claim 2 wherein the particulate matter is removed from the gaseous stream by passing the stream through a filtering surface.

6. The method of claim 2 wherein said alumina containing gaseous stream is maintained at a velocity of about 50 to 150 feet per second.

7. The method of claim 2 wherein said gaseous stream containing fluoride and condensable carbonaceous matter is the off-gas from an aluminum reduction cell having a horizontal stud Soderberg anode.

8. The method of claim 2 wherein the particulate matter removed from said gaseous stream is returned to the turbulent mass of pulverulent alumina maintained above the foraminous plate.

9. The method of claim 2 wherein at least a portion of the aluminum above said plate is removed therefrom and treated at high temperature and under oxidizing conditions to remove carbonaceous matter from said alumina.

10. A method of removing essentially all of the fluoride and tar and/or condensable carbonaceous matter from gaseous effluent from an aluminum reduction cell having a Soderberg-type electrode comprising
   a. withdrawing from the reduction cell a stream of gaseous effluent containing fluoride and tar and/or condensable carbonaceous matter;
   b. entraining pulverulent alumina into the essentially untreated gaseous stream withdrawn from the reduction cell to cause at least pat of the tar and/or carbonaceous matter therein to deposit and/or condense onto said entrained alumina;
   c. directing the alumina-containing gaseous stream to a chamber containing therein a foraminous plate and having pulverulent alumina disposed above the foraminous plate;

d. passing the alumina-containing gaseous stream through the foraminous plate so as to maintain the alumina above the plate in a turbulent condition and thereby remove essentially all gaseous fluoride from the gaseous stream; and e. subsequently removing essentially all particulate matter from the gaseous stream.

11. A method of removing essentially all of the fluoride and tar and/or condensable carbonaceous matter from gaseous effluent from an anode baking furnace comprising a. withdrawing from the anode baking furnace a stream of gaseous effluent containing fluoride and tar and/or condensable carbonaceous matter;

b. entraining pulverulent alumina into the essentially untreated gaseous stream withdrawn from the anode baking furnace to cause at least part of the tar and/or carbonaceous matter to deposit and/or condense onto said entrained alumina;

c. directing the alumina-containing gaseous stream to a chamber containing therein a foraminous plate and having pulverulent alumina disposed above the foraminous plate;

d. passing the alumina-containing gaseous stream through the foraminous plate so as to maintain the alumina above the plate in a turbulent condition and thereby remove essentially all gaseous fluorides from the gaseous stream; and e. subsequently removing essentially all particulate matter from the gaseous stream.

* * * * *